Patented June 29, 1954

2,682,518

UNITED STATES PATENT OFFICE 2,682,518

MIXTURES COMPRISING ACRYLONITRILE POLYMERS WITH INTERPOLYMERS OF ISOPROPENYL ACETATE AND ALKYL ACRYLATES

John R. Caldwell, Kingsport, Tenn., assignor to Eastman Kodak Company, Rochester, N. Y., a corporation of New Jersey No Drawing. Application August 1, 1951, Serial No. 239,835

20 Claims. (Cl. 260—30.4)

This invention relates to resinous compositions comprising mixtures of acrylonitrile polymers with interpolymers of isopropenyl acetate and alkyl acrylates, and to articles produced therefrom.

It is well known that fibers derived from polymers containing about 80 per cent or more by weight of acrylonitrile are very difficult to dye. In fact, the common types of dyes such as acid-wool, direct cotton, insoluble vat and cellulose acetate dyes do not color the fibers at all under standard dying procedures. The utility of acrylonitrile polymer fibers is, therefore, severely limited by this lack of dyeability.

Numerous attempts have been made to improve the properties of polyacrylonitrile and fibers produced therefrom. For example, acrylonitrile has been copolymerized with substantial amounts of certain other unsaturated monomers whose polymers are known to have good affinity for certain types of dyes in commercial use. While this procedure does give polymeric products having variably improved dyeing properties, a serious drawback arises in that fibers produced from such interpolymers show a materially lower softening point than is desirable and thereby limits their uses, especially for the production of fibers. Another procedure to improve the dyeing properties of polyacrylonitrile has been to mix the polyacrylonitrile, prior to spinning, with other non-polymerizable, film-forming materials which are known to be readily dyed by common types of dyes. However, it has been recognized that polyacrylonitrile and acrylonitrile polymers containing high percentages of acrylonitrile are incompatible or tend to be incompatible with most other high molecular weight materials, particularly in the percentage ranges required of the other added materials to produce compositions having good affinities for dyes. Out of many hundreds of polymers, resins, cellulose derivatives, etc. that have been tested in admixtures with polyacrylonitrile, only a relatively small number have been found compatible in the desired percentage ranges to give mixed compositions of good dyeability. For example, it can be demonstrated that mixtures of polyacrylonitrile with polyvinyl acetate, when dissolved in either N,N-dimethyl foramide or in N,N-dimethyl acetamide in proportions varying from 15 to 50 per cent by weight of polyvinyl acetate to from 85 to 50 per cent by weight of polyacrylonitrile, form grainy dopes which separate on standing into two liquid layers, and that fibers formed from such mixtures immediately after thorough admixture show segmentation into their individual components along their horizontal axes. This is true of many other polymeric compounds, natural or synthetic, which are soluble in the above solvents.

I have now found that acrylonitrile polymers containing from 75 per cent to 100 per cent by weight of acrylonitrile can be advantageously mixed in critical proportions with certain interpolymers of isopropenyl acetate and lower alkyl acrylates (e. g. methyl acrylate or ethyl acrylate) that solutions of these mixtures are homogeneous and stable, and that fibers prepared from these mixtures or solutions show not only satisfactory softening points, non-segmentation and other good physical properties, but also can be deeply dyed to dark shades with cellulose acetate type dyes.

It is, accordingly, an object of the invention to provide resinous compositions comprising mixtures of acrylonitrile polymers containing at least 75 per cent or more by weight of acrylonitrile with certain interpolymers of isopropenyl acetate and lower alkyl acrylates. Another object is to provide methods for preparing these mixtures. Another object is to provide homogeneous solutions of these mixtures. Another object is to provide fibers from these mixtures of good dyeability. Other objects will become apparent hereinafter.

In accordance with the invention, I prepare resinous compositions comprising mixtures of from 60 to 90 parts by weight of polyacrylonitrile or of an acrylonitrile polymer containing at least 75 per cent by weight of acrylonitrile, and from 40 to 10 parts by weight of an interpolymer of isopropenyl acetate with a lower alkyl acrylate, but the preferred compositions are mixtures comprising from 65 to 80 parts of the polymeric acrylonitrile compound and from 35 to 20 parts of the isopropenyl acetate interpolymer. The above mixtures can be prepared by any of several methods. The two polymeric components can be mixed together in a suitable mixer such as a ball mill or Banbury mixer or they can be dissolved in one or more mutual solvents such as N,N-dimethyl formamide, N,N-dimethyl acetamide, ethylene carbonate, N-methyl-2-pyrrolidone, gamma - butyrolactone, mixtures of acetonitrile and N,N-dimethylformamide, etc. The components can be mixed together before addition to the solvent or they can be added separately to the solvent. They can also be added to the solvent to produce a slurry or dispersion, which is then agitated and heated to complete solution. The solubility of the resins can be improved by incorporating a small amount of acids such as sulfuric, phosphoric, oxalic, etc. acids. Fillers, lubricants, etc. can also be added as desired. The concentration of solids in the solvents can be varied, depending on the use for which the composition is intended. However, for most purposes it has been found that from about 10 per cent to 40 per cent by weight of solids gives the best results. Other solvents less preferred but which can also be used in the preparation of solutions with the new resinous compositions include ethylene carbamate, N,N-dimethylmethoxy acetamide, N,N - dimethyl cyanoacetamide, dimethyl cyanamide, N,N - di-methyl - β - cyanopropionamide, glycolnitrile (formaldehyde cyanohydrin), malonitrile, dimethyl sulfoxide, dimethyl sulfone, tetramethylene sulfone, tetramethylene sulfoxide, N-formylmorpholine, N,N-tetramethyl methanephosphonamide, etc.

The solutions prepared as above described, especially when dispersed in N,N-dimethyl formamide, N,N-dimethyl acetamide, ethylene carbonate, N-methyl-2-pyrrolidone, gamma - butyrolactone and mixtures of acetonitrile and N,N-dimethyl formamide, are stable, homogeneous mixtures which show no tendency to separate into the components. The absence of graininess in these solutions permits smooth, trouble-free extrusion through jets in wet spinning methods employing aqueous spinning baths or organic liquids such as the lower alcohols (methanol, ethanol, etc.) and in dry spinning or evaporative methods wherein the solution or dope is extruded into a heated atmosphere of air, steam or other gas. Processes for both wet and dry spinning the resinous compositions of the invention can be carried out as described in my copending application Serial No. 16,624, filed March 23, 1948 (now U. S. Patent No. 2,591,670, dated April 8, 1952). The solutions can be stored for any length of time prior to spinning without change in the solutions. Fibers prepared from the solutions by either wet or dry spinning methods can be readily dyed to even, dark shades with cellulose acetate dyes. The dyed fibers show excellent fastness to light and laundering.

The interpolymers of isopropenyl acetate useful in practicing the invention contain from 20 to 50 per cent by weight of isopropenyl acetate and from 80 to 50 per cent by weight of methyl or ethyl acrylate, but the preferred interpolymers contain from 25 to 40 per cent of isopropenyl acetate and from 75 to 60 per cent of either methyl acrylate or ethyl acrylate. These interpolymers can be made by the usual bead, emulsion or mass polymerization procedures with peroxide type polymerization catalysts. If mass polymerization is used, the polymerization reaction is conveniently carried out at a temperature of 40° to 60° C. for a period of 24-48 hours, in the presence of 0.2-1.0 per cent of benzoyl peroxide or acetyl peroxide. When the interpolymers are made by the emulsion procedure, a soap, fatty alcohol sulfate or other dispersing agent is employed. Water-soluble catalysts such as potassium persulfate, sodium persulfate, hydrogen peroxide, etc. are advantageously employed in the emulsion polymerizations.

The acrylonitrile polymers which are used in practicing the invention may be 100 per cent polyacrylonitrile or they may be copolymers containing at least 75 per cent by weight of acrylonitrile, but preferably from 80 to 95 per cent by weight of acrylonitrile and from 20 to 5 per cent of the other unsaturated monomer making up the copolymer. Suitable copolymers include any of the vinyl or other unsaturated monomers containing a single ethylenic unsaturation which are known to be copolymerizable with acrylonitrile, but preferably copolymers such as acrylonitrile-vinyl chloride, acrylonitrile-methallyl alcohol, acrylonitrile-methallyl urethane, acrylonitrile-isopropenyl acetate, acrylonitrile-vinyl carboxylic esters such as vinyl acetate, etc. The acrylonitrile polymers can be prepared according to the process described in U. S. Patent 2,434,054, dated January 6, 1948.

The following examples will serve to illustrate more fully the manner in which the invention is practiced.

*Example 1*

A mixture of 60 g. of methyl acrylate, 40 g. of isopropenyl acetate, 2 g. of the sodium salt of dodecyl sulfate, 1 g. of sodium bisulfite, 1.5 g. of potassium persulfate and 800 g. of water was placed in a flask and stirred at 55°-60° C. for a period of 40 hours. The emulsion was coagulated by adding sodium sulfate, and the precipitated interpolymeric resin was washed with water and dried. It contained methyl acrylate and isopropenyl acetate substantially in the same proportions as the starting polymerization mixture.

100 parts by weight of polyacrylonitrile and 30 parts by weight of the above prepared isopropenyl acetate-methyl acrylate interpolymer were dissolved in 700 parts by weight of dimethyl acetamide, to give a clear, smooth solution or dope. The dope was extruded through a multihole spinnerette into a coagulating bath consisting of 60 parts by weight of water and 40 parts by weight of dimethyl acetamide. The filaments obtained were washed with water and dried. They were then drafted 700 per cent in a heated tube at 170°-180° C. Yarn testing 3.8 g. per denier and 19 per cent elongation was obtained. The yarn showed excellent dyeing to dark, fast shades with cellulose acetate dyes.

*Example 2*

50 parts by weight of isopropenyl acetate and 50 parts of methyl acrylate were interpolymerized following the procedure described in Example 1. The interpolymeric resin obtained contained in each molecule approximately 50 per cent by weight of isopropenyl acetate, the remainder being methyl acrylate.

100 parts by weight of a copolymeric resin containing approximately 88 per cent by weight of acrylonitrile and approximately 12 per cent by weight of isopropenyl acetate, and 25 parts by weight of the above described interpolymeric resin were dissolved in 650 parts by weight of gamma-butyrolactone. Fibers spun from the dope in the manner described in Example 1, showed good affinity for cellulose acetate dyes.

*Example 3*

An interpolymer having the composition 40 per cent by weight of isopropenyl acetate and 60 per cent by weight of ethyl acrylate was prepared by the procedure of Example 1.

100 parts by weight of a copolymeric resin containing approximately 90 per cent by weight of acrylonitrile and approximately 10 per cent by weight of methallyl alcohol, and 40 parts by weight of the above interpolymer of isopropenyl acetate and ethyl acetate were dissolved in 450 parts by weight of dimethyl formamide. The dope was extruded downward through a multihole spinnerette into a vertical hot air cabinet maintained at 250–270° C. The filaments obtained were collected at the bottom on a godet roll and were then drafted 600–800 per cent in a heated chamber at 150°–160° C. Yarn having a tensile strength of 3.5 g. per denier and an elongation of 22 per cent was obtained. The yarn was readily colored dark shades with cellulose acetate dyes.

*Example 4*

An interpolymer having the composition 25 per cent by weight of isopropenyl acetate and 75 per cent by weight of methyl acrylate was prepared by the procedure of Example 1. A spinning dope was prepared by dissolving 90 parts by weight of polyacrylonitrile and 10 parts by weight of the above interpolymer of isopropenyl acetate and methyl acrylate in 600 parts by weight of dimethyl formamide. Fibers spun from the dope by the evaporative process showed good dyeing with cellulose acetate dyes.

*Example 5*

An interpolymer was prepared by heating 80 parts by weight of ethyl acrylate, 20 parts by weight of isopropenyl acetate and 2 parts by weight of benzoyl peroxide at 50° C. for 40 hours. A spinning dope was prepared by dissolving 60 parts by weight of polyacrylonitrile and 40 parts by weight of the above interpolymer of isopropenyl acetate and ethyl acrylate in 450 parts by weight of dimethyl acetamide. Fibers spun from the dope by the process described in Example 1, showed good tensile strength and elongation and affinity for cellulose acetate dyes.

While the invention has been illustrated with certain specific mixtures of acrylonitrile polymers with interpolymers of isopropenyl acetate and alkyl acrylates, it will be apparent that any mixture coming within the specified percentage ranges will have similarly good dyeing affinities and physical properties. For example, interpolymers wherein the isopropenyl acetate content is 30 per cent, 32 per cent, 34 per cent or 36 per cent, the remainder of the molecule in each case being either methyl acrylate or ethyl acrylate, give in admixture with polyacrylonitrile or with any of the mentioned acrylonitrile copolymers, homogeneous solutions with polyacrylonitrile solvents which are stable and from which can be spun fibers of excellent tensile strength and satisfactory elongation and dyeing affinities for cellulose acetate type dyes. The solutions or dopes of any of the resinous compositions of the invention can also be coated on film-forming surfaces to give sheet materials which are tough and flexible. The dopes can also have incorporated therein, if desired, fillers, dyes, plasticizers, and the like.

What I claim is:

1. A resinous composition selected from the group consisting of a mixture comprising from 60 to 90 parts by weight of polyacrylonitrile and from 40 to 10 parts by weight of a copolymer containing from 20 to 50 per cent by weight of isopropenyl acetate and from 80 to 50 per cent by weight of an alkyl acrylate wherein the alkyl group contains from 1 to 2 carbon atoms, and a mixture comprising from 60 to 90 parts by weight of a copolymer containing from 75 to 95 per cent by weight of acrylonitrile and from 25 to 5 per cent by weight of a compound selected from the group consisting of isopropenyl acetate and methallyl alcohol and from 40 to 10 parts by weight of a copolymer containing from 20 to 50 per cent by weight of isopropenyl acetate and from 80 to 50 per cent by weight of an alkyl acrylate wherein the alkyl group contains from 1 to 2 carbon atoms.

2. A resinous composition comprising a mixture of from 65 to 80 parts by weight of polyacrylonitrile and from 35 to 20 parts by weight of an interpolymer containing from 25 to 40 per cent by weight of isopropenyl acetate and from 75 to 60 per cent by weight of methyl acrylate.

3. A resinous composition comprising a mixture of from 65 to 80 parts by weight of polyacrylonitrile and from 35 to 20 parts by weight of an interpolymer containing from 25 to 40 per cent by weight of isopropenyl acetate and from 75 to 60 per cent by weight of ethyl acrylate.

4. A resinous composition comprising a mixture of from 65 to 80 parts by weight of a copolymeric resin containing from 80 to 95 per cent by weight of acrylonitrile and from 20 to 5 per cent by weight of methallyl alcohol, and from 35 to 20 parts by weight of an interpolymer containing from 25 to 40 per cent by weight of isopropenyl acetate and from 75 to 60 per cent by weight of methyl acrylate.

5. A resinous composition comprising a mixture of from 65 to 80 parts by weight of a copolymeric resin containing from 80 to 95 per cent by weight of acrylonitrile and from 20 to 5 per cent by weight of methallyl alcohol, and from 35 to 20 parts by weight of an interpolymer containing from 25 to 40 per cent by weight of isopropenyl acetate and from 75 to 60 per cent by weight of ethyl acrylate.

6. A resinous composition comprising a mixture of from 60 to 90 parts by weight of a copolymeric resin containing from 80 to 95 per cent by weight of acrylonitrile and from 20 to 5 per cent by weight of isopropenyl acetate, and from 40 to 10 parts by weight of an interpolymer containing from 20 to 50 per cent by weight of isopropenyl acetate and from 80 to 50 per cent by weight of methyl acrylate.

7. A resinous composition comprising a mixture of 100 parts by weight of polyacrylonitrile and 30 parts by weight of an interpolymer containing 40 per cent by weight of isopropenyl acetate and 60 per cent by weight of methyl acrylate.

8. A resinous composition comprising a mixture of 100 parts by weight of polyacrylonitrile and 30 parts by weight of an interpolymer containing 40 per cent by weight of isopropenyl acetate and 60 per cent by weight of ethyl acrylate.

9. A resinous composition comprising a mixture of 100 parts by weight of a copolymeric resin containing 90 per cent by weight of acrylonitrile and 10 per cent by weight of methallyl alcohol, and 40 parts by weight of an interpolymer containing 40 per cent by weight of isopropenyl acetate and 60 per cent by weight of methyl acrylate.

10. A resinous composition comprising a mixture of 100 parts by weight of a copolymeric resin containing 90 per cent by weight of acrylonitrile and 10 per cent by weight of methallyl alcohol, and 40 parts by weight of an interpolymer containing 40 per cent by weight of isopropenyl acetate and 60 per cent by weight of ethyl acrylate.

11. A resinous composition comprising a mixture of 100 parts by weight of a copolymeric resin containing 88 per cent by weight of acrylonitrile and 12 per cent by weight of isopropenyl acetate, and 25 parts by weight of an interpolymer containing 50 per cent by weight of isopropenyl acetate and 50 per cent by weight of methyl acrylate.

12. A solution of a resinous composition selected from the group consisting of a mixture comprising from 60 to 90 parts by weight of polyacrylonitrile and from 40 to 10 parts by weight of a copolymer containing from 20 to 50 per cent by weight of isopropenyl acetate and from 80 to 50 per cent by weight of an alkyl acrylate wherein the alkyl group contains from 1 to 2 carbon atoms, and a mixture comprising from 60 to 90 parts by weight of a copolymer containing from 75 to 95 per cent by weight of acrylonitrile and from 25 to 5 per cent by weight of a compound selected from the group consisting of isopropenyl acetate and methallyl alcohol and from 40 to 10 parts by weight of a copolymer containing from 20 to 50 per cent by weight of isopropenyl acetate and from 80 to 50 per cent by weight of an alkyl acrylate wherein the alkyl group contains from 1 to 2 carbon atoms, in a solvent selected from the group consisting of N,N-dimethyl formamide, N,N-dimethyl acetamide, ethylene carbonate, N-methyl-2-pyrrolidone and gamma-butyrolactone.

13. A solution of a resinous composition comprising a mixture of from 65 to 80 parts by weight of polyacrylonitrile and from 35 to 20 parts by weight of an interpolymer containing from 25 to 40 per cent by weight of isopropenyl acetate and from 75 to 60 per cent by weight of methyl acrylate, in N,N-dimethyl acetamide.

14. A solution of a resinous composition comprising a mixture of from 65 to 80 parts by weight of polyacrylonitrile and from 35 to 20 parts by weight of an interpolymer containing from 25 to 40 per cent by weight of isopropenyl acetate and from 75 to 60 per cent by weight of ethyl acrylate, in N,N-dimethyl acetamide.

15. A solution of a resinous composition comprising a mixture of from 65 to 80 parts by weight of a copolymeric resin containing from 80 to 95 per cent by weight of acrylonitrile, and from 20 to 5 per cent by weight of methallyl alcohol, and from 35 to 20 parts by weight of an interpolymer containing from 25 to 40 per cent by weight of isopropenyl acetate and from 75 to 60 per cent by weight of methyl acrylate, in N,N-dimethyl formamide.

16. A solution of a resinous composition comprising a mixture of from 65 to 80 parts by weight of a copolymeric resin containing from 80 to 95 per cent by weight of acrylonitrile and from 20 to 5 per cent by weight of methallyl alcohol, and from 35 to 20 parts by weight of an interpolymer containing from 25 to 40 per cent by weight of isopropenyl acetate and 75 to 60 per cent by weight of ethyl acrylate, in N,N-dimethyl formamide.

17. A solution of a resinous composition comprising a mixture of from 60 to 90 parts by weight of a copolymeric resin containing from 80 to 90 per cent by weight of acrylonitrile and from 20 to 5 per cent by weight of isopropenyl acetate, and from 40 to 10 parts by weight of an interpolymer containing from 20 to 50 per cent by weight of isopropenyl acetate and from 80 to 50 per cent by weight of methyl acrylate, in gamma-butyrolactone.

18. A solution of a resinous composition comprising a mixture of 100 parts by weight of polyacrylonitrile and 30 parts by weight of an interpolymer containing 40 per cent by weight of isopropenyl acetate and 60 per cent by weight of methyl acrylate, in N,N-dimethyl acetamide.

19. A solution of a resinous composition comprising a mixture of 100 parts by weight of a copolymeric resin containing 90 per cent by weight of acrylonitrile and 10 per cent by weight of methallyl alcohol and 40 parts by weight of an interpolymer containing 40 per cent by weight of isopropenyl acetate and 60 per cent by weight of ethyl acrylate, in N,N-dimethyl formamide.

20. A solution of a resinous composition comprising a mixture of 100 parts by weight of a copolymeric resin containing 88 per cent by weight of acrylonitrile and 12 per cent by weight of isopropenyl acetate, and 25 parts by weight of an interpolymer containing 50 per cent by weight of isopropenyl acetate and 50 per cent by weight of methyl acrylate, in gamma-butyrolactone.

References Cited in the file of this patent

UNITED STATES PATENTS

| Number | Name | Date |
|---|---|---|
| 2,527,863 | Webb | Oct. 31, 1950 |
| 2,558,793 | Stanin et al. | July 3, 1951 |
| 2,571,683 | Coover Jr. et al. | Oct. 16, 1951 |
| 2,571,777 | Stanin et al. | Oct. 16, 1951 |
| 2,575,006 | Coover et al. | Nov. 13, 1951 |